(12) United States Patent
Hatasawa et al.

(10) Patent No.: US 7,859,552 B2
(45) Date of Patent: Dec. 28, 2010

(54) IMAGE PROCESSING APPARATUS

(75) Inventors: Yasunari Hatasawa, Tokyo (JP); Shinichiro Gomi, Chiba (JP); Masami Ogata, Kanagawa (JP)

(73) Assignee: Sony Corporation, Tokyo (JP)

( * ) Notice: Subject to any disclaimer, the term of this patent is extended or adjusted under 35 U.S.C. 154(b) by 849 days.

(21) Appl. No.: 11/656,938

(22) Filed: Jan. 24, 2007

(65) Prior Publication Data

US 2007/0177167 A1 Aug. 2, 2007

(30) Foreign Application Priority Data

Jan. 31, 2006 (JP) ............................. 2006-023314

(51) Int. Cl.
*G09G 5/00* (2006.01)
(52) U.S. Cl. ...................... 345/639; 345/582
(58) Field of Classification Search ......... 345/582–588, 345/660–671
See application file for complete search history.

(56) References Cited

U.S. PATENT DOCUMENTS 5,946,417 A * 8/1999 Bonneau et al. ............. 382/236
6,141,017 A 10/2000 Cubillo et al.
6,928,397 B1 8/2005 Matsushiro
2003/0179953 A1 9/2003 Ishizaka

FOREIGN PATENT DOCUMENTS

JP 2003-283811 10/2003

OTHER PUBLICATIONS

European Search Report; Application No. 07101489.8-2218; Dated: May 23, 2007.

\* cited by examiner

*Primary Examiner*—Aaron M Richer
(74) *Attorney, Agent, or Firm*—Rader, Fishman & Grauer PLLC

(57) ABSTRACT

A image processing apparatus includes a first image converting section for converting an original image into an output resolution image, a second image converting section for converting the original image into an intermediate resolution image, a similarity information generating section for detecting a plurality of similar areas, in a block in the intermediate resolution image corresponding to a predetermined partial area in the output resolution image, that resemble the partial area, and for generating similarity information including a position of each of the plurality of similar areas in the intermediate resolution image and a weight of the position, a texture generating section for generating a texture image by combining high-frequency components of the intermediate resolution image at the position according to the weight, and a texture blending section for blending the output resolution image and the texture image to generate output image.

2 Claims, 19 Drawing Sheets

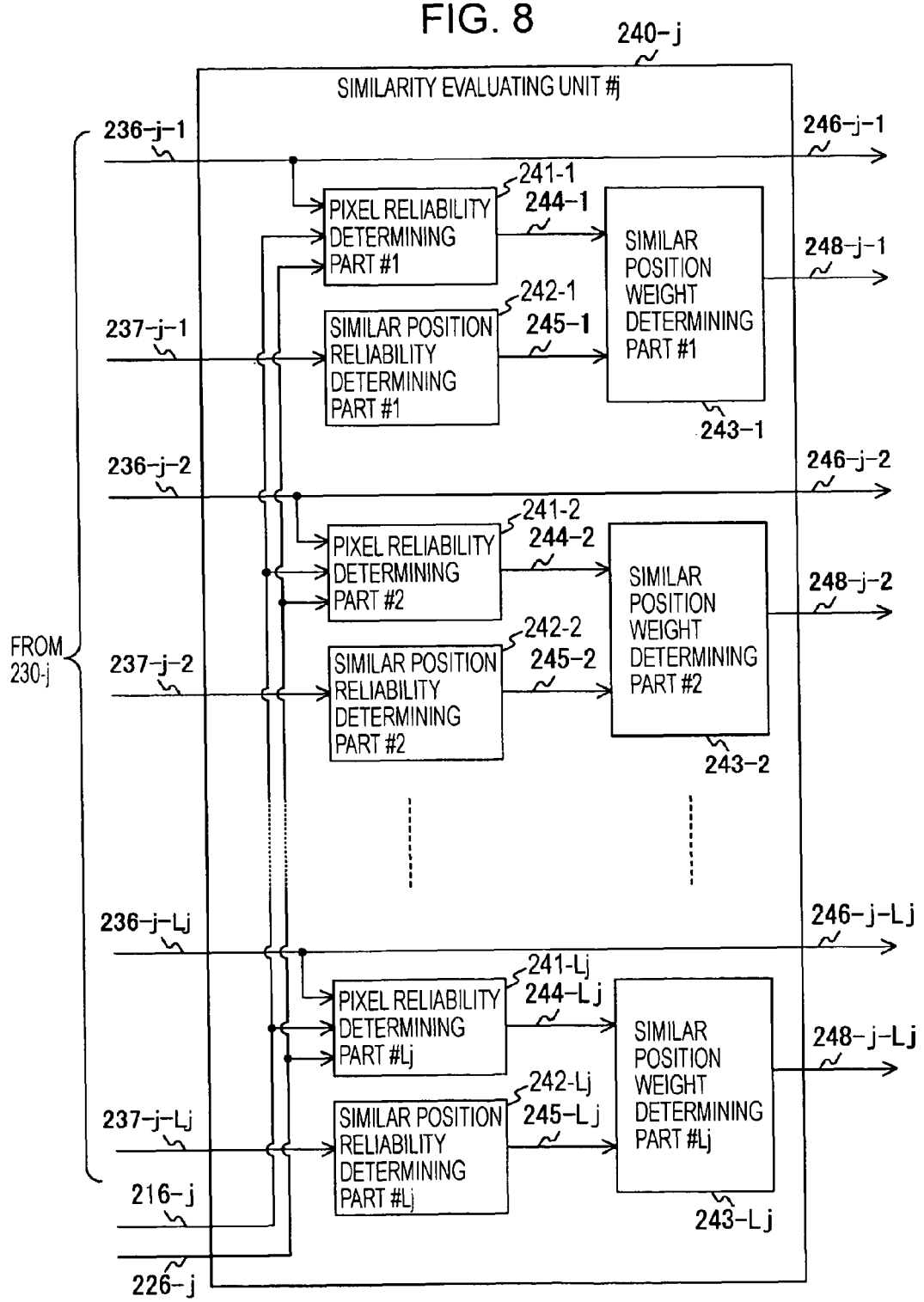

IMAGE PROCESSING APPARATUS

CROSS REFERENCES TO RELATED APPLICATIONS

The present invention contains subject matter related to Japanese Patent Application JP 2006-023314 filed in the Japanese Patent Office on Jan. 31, 2006, the entire contents of which are incorporated herein by reference.

BACKGROUND OF THE INVENTION

1. Field of the Invention

The present invention relates to image processing apparatuses and, in particular, to an image processing apparatus for generating an output image in which high-frequency components of an original image are compensated, a method for the same, and a program causing a computer to execute the method.

2. Description of the Related Art

It is known that an output image tends to blur when an original digital image constituted by a plurality of pixels is enlarged by simply performing linear interpolation using a linear filter or the like. Accordingly, techniques to prevent image degradation by performing enlargement processing of a block having the highest similarity on the basis of the self-similarity of an image have been utilized.

For example, an image processing apparatus that performs block image enlargement processing is proposed (see, for example, Japanese Unexamined Patent Application Publication No. 2003-283811 (FIG. 2)). The image processing apparatus acquires an enlarged pseudo domain block image, which is a range block image enlarged on the basis of the relationship between a domain block image in an original image and the range block image existing near the domain block image, and replaces the enlarged domain block image with the enlarged pseudo domain block image, thereby performing the block image enlargement processing.

SUMMARY OF THE INVENTION

In the above-mentioned known techniques, when generating enlarged images, a block image having the highest similarity is selected and used for enlargement processing. However, since another block image is selected when there is a slight difference between the images, the images alter instantaneously. More specifically, when the known techniques are applied to image processing of moving images, the block image on which the enlargement processing is performed is frequently switched to another, which may cause flicker.

Accordingly, according to embodiments of the present invention, image processing apparatuses that generate an output image having resolution the same as or higher than that of an original image can generate stable output images having higher-quality than the original image.

Embodiments of the present invention are made to address the above-described disadvantages. According to an embodiment of the present invention, an image processing apparatus, which generates an output image having a resolution the same as or higher than that of the original image, the image processing apparatus, includes first image converting means for converting the resolution of the original image into the same resolution as the output image so as to generate an output resolution image, second image converting means for converting the resolution of the original image into a resolution different from that of the output image so as to generate an intermediate resolution image, similarity information generating means for detecting a plurality of similar areas, in a block in the intermediate resolution image corresponding to a predetermined partial area in the output resolution image, that resemble the partial area, and for generating similarity information including a position of each of the plurality of similar areas in the intermediate resolution image and a weight of the position, texture generating means for generating a texture image by combining high-frequency components of the intermediate resolution image at the position indicated in the similarity information in accordance with the weight indicated in the similarity information, and texture blending means for blending the output resolution image and the texture image so as to generate output image. This configuration advantageously allows the image processing apparatus to generate the stable output image having higher-quality than the original image by compensating high-frequency components in the output image with the texture image resulting from combination of high-frequency components in the plurality of similar areas in the intermediate resolution image.

In addition, according to the embodiment, the second image converting means may generate a plurality of intermediate resolution images having resolutions different from each other. The similarity information generating means may generate the similarity information for each of the plurality of intermediate resolution images. The texture generating means may generate a texture image for each of the plurality of intermediate resolution images. The texture blending means may blend the plurality of texture images and the output resolution image so as to generate the output image. This configuration advantageously allows the image processing apparatus to generate the higher-quality output image using the texture images based on the plurality of resolutions.

In addition, according to the embodiment, the similarity information generating means may select a plurality of areas each having a different size from the others as the partial area. The texture generating means may generate a texture image for each of the plurality of partial areas each having a different size. The texture blending means may blend the plurality of the texture images and the output resolution image so as to generate the output image. This configuration advantageously allows the image processing apparatus to generate the higher-quality output image using the texture images based on the plurality of detection sizes according to features in the intermediate image.

Additionally, according to the embodiment, the similarity information generating means may select a position where a value based on a brightness difference from that of the partial area is a relative minimum as the position of the similar area.

Furthermore, according to the embodiment, the texture generating means may generate a texture block in the block by combining the high-frequency components of the intermediate resolution image at the position indicated in the similarity information in accordance with the weight indicated in the similarity information, and may generate the texture image by tiling the texture block. This configuration advantageously allows the image processing apparatus to generate the output image on the basis of the higher-quality texture image.

Moreover, according to another embodiment of the present invention, an image processing method for an image processing apparatus that generates an output image having a resolution the same as or higher than that of the original image or a program causing a computer to execute the method includes the steps of converting the resolution of the original image into the same resolution as the output image so as to generate an output resolution image, converting the resolution of the original image into a resolution different from that of the output image so as to generate an intermediate resolution image, detecting a plurality of similar areas, in a block in the intermediate resolution image corresponding to a predetermined partial area in the output resolution image, that resemble the partial area, and generating similarity information including a position of each of the plurality of similar areas in the intermediate resolution image and a weight of the position, generating a texture image by combining high-frequency components of the intermediate resolution image at the position indicated in the similarity information in accordance with the weight indicated in the similarity information, and blending the output resolution image and the texture image so as to generate output image. This advantageously allows generation of the stable output image having higher-quality than the original image by compensating high-frequency components in the output image with the texture image resulting from combination of high-frequency components in the plurality of similar areas in the intermediate resolution image.

The embodiments of the present invention provide an excellent advantage that allows generation of the stable output image having higher-quality than the original image.

BRIEF DESCRIPTION OF THE DRAWINGS

FIG. 8 is a diagram showing an example of a configuration of a similarity evaluating unit 240-$j$ according to an embodiment of the present invention;

DESCRIPTION OF THE PREFERRED EMBODIMENTS

Embodiments of the present invention will be described in detail next with reference to the drawings.

Figure 1:
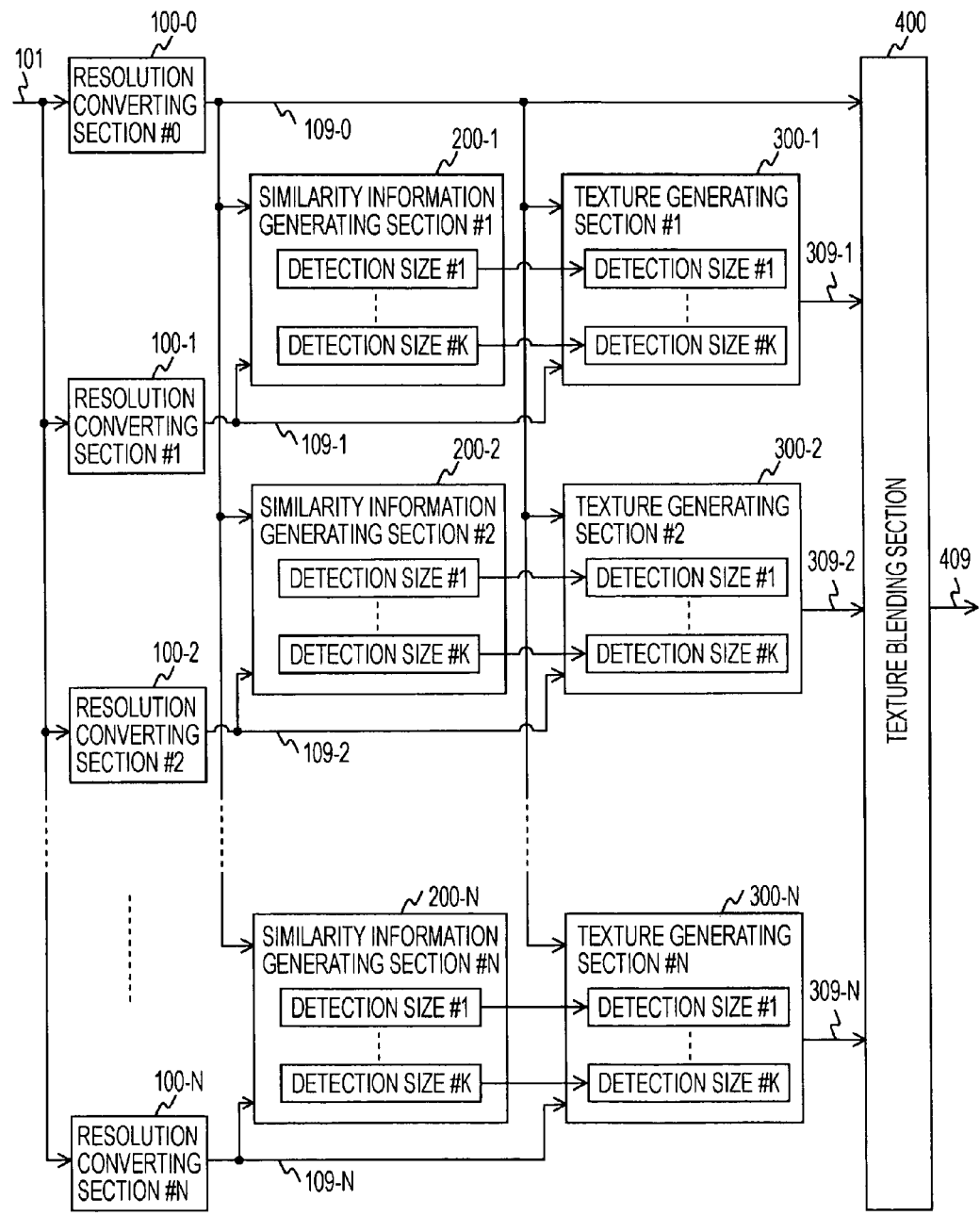
FIG. 1 is a diagram showing an example of a configuration of an image processing apparatus according to an embodiment of the present invention.

FIG. 1 is a diagram showing an example of a configuration of an image processing apparatus according to an embodiment of the present invention. This image processing apparatus generates an output image 409 having a resolution the same as or higher than that of an original image 101. The image processing apparatus has (N+1) (N is an integer greater than 0) resolution converting sections 100, N similarity information generating sections 200, N texture generating sections 300, and a texture blending section 400. In the following description, identification numerals are attached to the reference numerals to identify elements having the same configurations. For example, the similarity information generating section 200-N represents an Nth similarity information generating section 200.

Each of the resolution converting sections 100-0 to 100-N converts the resolution of the original image into a predetermined resolution. Linear interpolation using, such as, for example, a Lanczos filter, as well as nonlinear interpolation can be utilized in the resolution conversion. The 0th resolution converting section 100-0 among the N+1 resolution converting sections 100 converts the resolution of the original image 101 into the same resolution as that of the output image 409 so as to generate an output resolution image 109-0. On the other hand, other resolution converting sections 100-1 to 100-N convert the resolution of the original image 101 into a resolution different from that of the output image 409 so as to generate intermediate resolution images 109-1 to 109-N, respectively.

Enlargement ratios employed by the resolution converting sections 100-0 to 100-N may be any values. That is, the ratio may be not only more than 100% but also 100% or less. If the enlargement ratio is set at 100%, the operations by the resolution converting sections 100-0 to 100-N may be omitted. When the enlargement ratio is set at 100% in the resolution converting section 100-0, the original image 101 is not enlarged and the resolution of the output image 409 matches that of the original image 101. However, even if the enlargement ratio is set at 100% in the resolution converting section 100-0, the image processing apparatus can generate a natural-looking higher-quality image using the intermediate resolution images 109-1 to 109-N having the resolution converted at the given enlargement ratio by the other resolution converting sections 100-1 to 100-N.

The similarity information generating sections 200-1 to 200-N detect positions of areas in the intermediate resolution images 109-1 to 109-N similar to those of a detection template in the output resolution image 109-0, respectively, and generate similarity information after evaluating the similarity.

The detection template is an area set in the output resolution image 109-0. Users can set this area freely. One or more sizes can be set for the detection templates. K (K is an integer greater than 0) sizes set for the detection templates are referred to as "detection sizes".

The texture generating sections 300-1 to 300-N generate texture images by combining high-frequency components of the intermediate resolution images 109-1 to 109-N, respectively, on the basis of the similarity information generated by the similarity information generating sections 200. The texture generating sections 300-1 to 300-N, like the similarity information generating sections 200-1 to 200-N, perform processing in accordance with the K detection sizes, and generate N texture images 309-1 to 309-N corresponding to the intermediate resolution images 109-1 to 109-N, respectively.

The texture blending section 400 blends the output resolution image 109-0 and the texture images 309-1 to 309-N so as to generate the output image 409. That is, the texture images 309-1 to 309-N having high-frequency components of the intermediate resolution images 109-1 to 109-N are blended with the output resolution image 109-0, whereby the high-frequency components are compensated in the output image 409.

Figure 2:
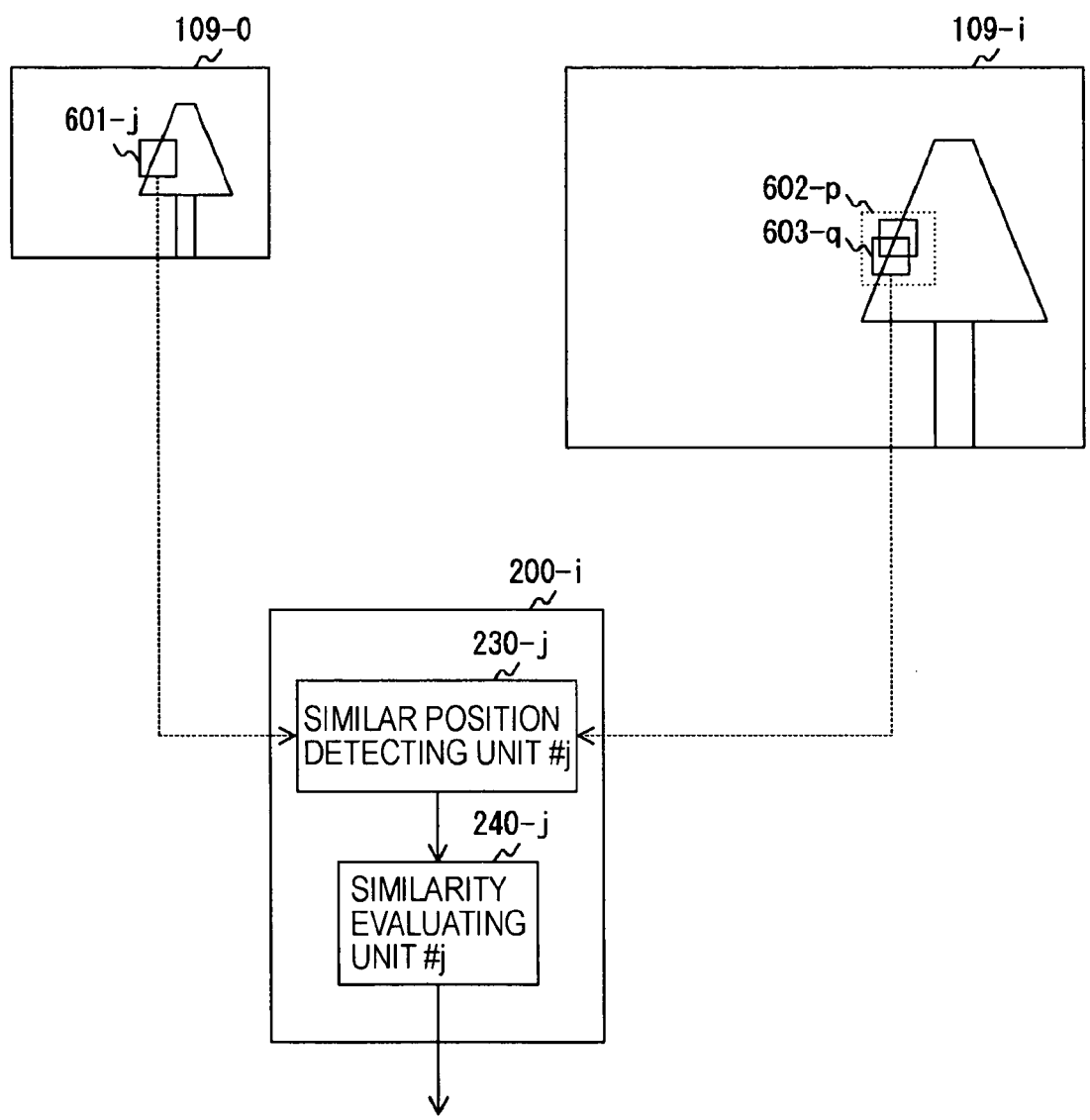
FIG. 2 is a diagram showing a manner of detecting similar positions according to an embodiment of the present invention.

FIG. 2 is diagram showing a manner of detecting similar positions according to an embodiment of the present invention. An ith (i is an integer, $1 \leq i \leq N$) similarity information generating section 200-$i$ among the similarity information generating sections 200-1 to 200-N performs an image detection operation in an ith intermediate resolution image 109-$i$. As described below, the similarity information generating section 200-$i$ has K similar position detecting units 230-1 to 230-K. A jth (j is an integer, $1 \leq j \leq N$) similar position detecting unit 230-$j$ performs the image detection operation using a detection template 601-$j$ having a jth detection size existing in the output resolution image 109-0.

An area in the intermediate resolution image 109-$i$ corresponding to the detection template 601-$j$ is referred to as a detection block. Corresponding to the detection sizes, there are C(j) detecting blocks. Here, C(j) is a function of j, and indicates an integer greater than 0. Hereinafter, C(j) may be abbreviated as Cj. In this figure, a pth (p is an integer, $1 \leq p \leq C(j)$) detection block 602-$p$ is shown.

The similar position detecting unit 230-$j$ performs the image detection operation in the detection block 602-$p$ using the detection template 601-$j$, and detects L(j) similar positions according to the detection sizes. Here, L(j) is a function of j, and indicates an integer greater than 0. Hereinafter, L(j) may be abbreviated as Lj. In this figure, a qth (q is an integer, $1 \leq q \leq L(j)$) similar position 603-$q$ is shown.

The L(j) similar positions are detected in each of the C(j) detection blocks after performing the image detection operation in the N intermediate resolution images using the detection templates having the K detection sizes in the above-described manner. The similar positions detected at this time and weights of the similar positions are collectively referred to as similarity information.

Figure 3:
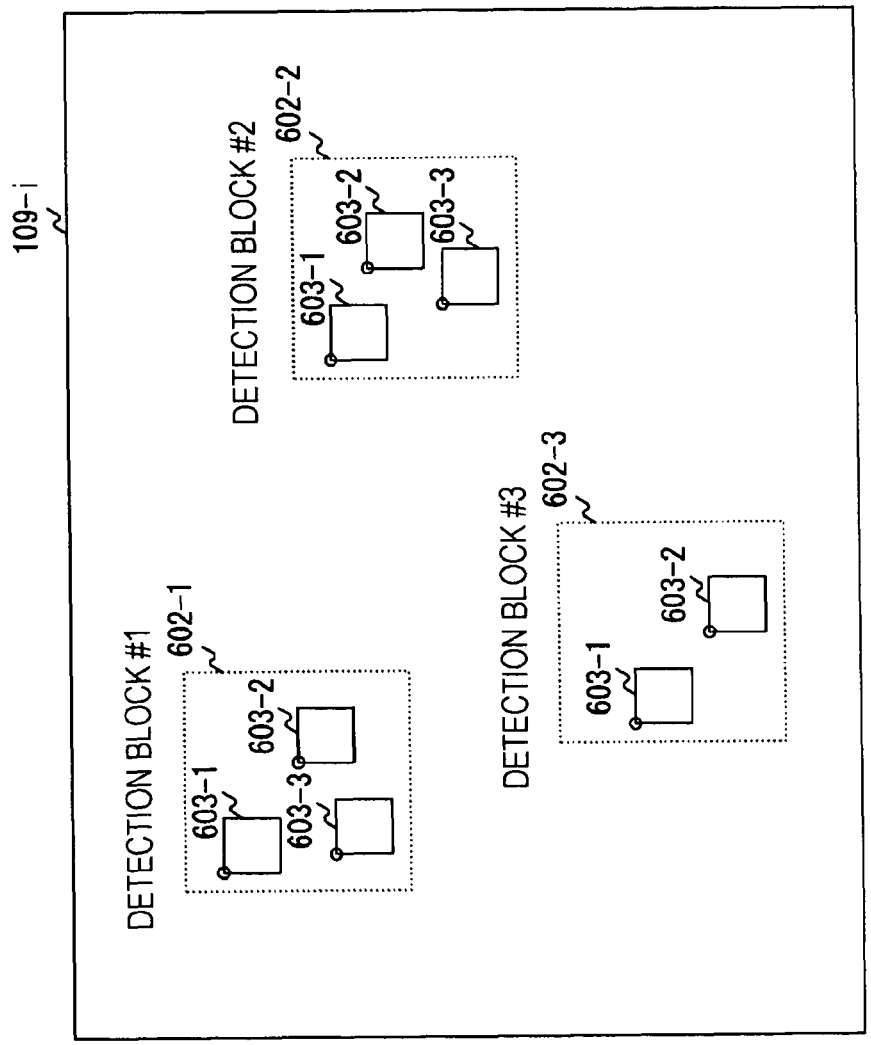
FIG. 3 is a diagram showing an example of detection blocks and similar positions according to an embodiment of the present invention.

FIG. 3 is a diagram showing an example of detection blocks and similar positions according to an embodiment of the present invention. In this figure, there are three detection blocks 602-1 to 602-3 in the ith intermediate resolution image 109-$i$.

Three similar positions 603-1 to 603-3 are detected in a first detection block 602-1. Similarly, three similar positions 603-1 to 603-3 are detected in a second detection block 602-2, whereas two similar positions 603-1 and 603-2 are detected in a third detection block 602-3. Although the same reference numerals (e.g., 603-1 to 603-3) are assigned to the similar positions in different detection blocks in this example, those similar positions differ from one another.

Figure 4:
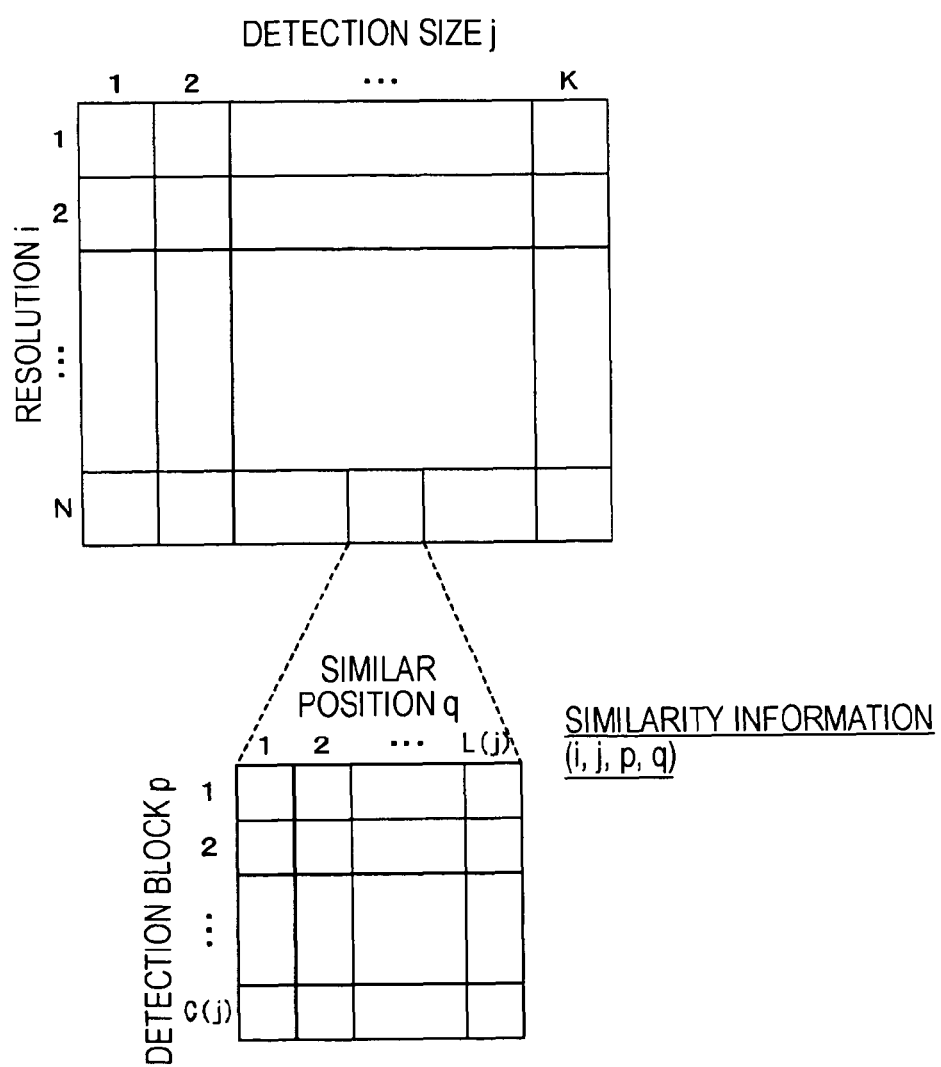
FIG. 4 is a diagram showing an example of a data structure of similarity information according to an embodiment of the present invention.

FIG. 4 is a diagram showing an example of a data structure of similarity information according to an embodiment of the present invention. The similarity information may be represented as a four-dimensional array having indexes, i, j, p, and q. More specifically, the similarity information regarding the qth similar position detected in the pth detection block when the image detection operation is performed in the ith intermediate resolution image using the detection template having the jth detection size is represented as "similarity information (i, j, p, q)".

Figure 5:
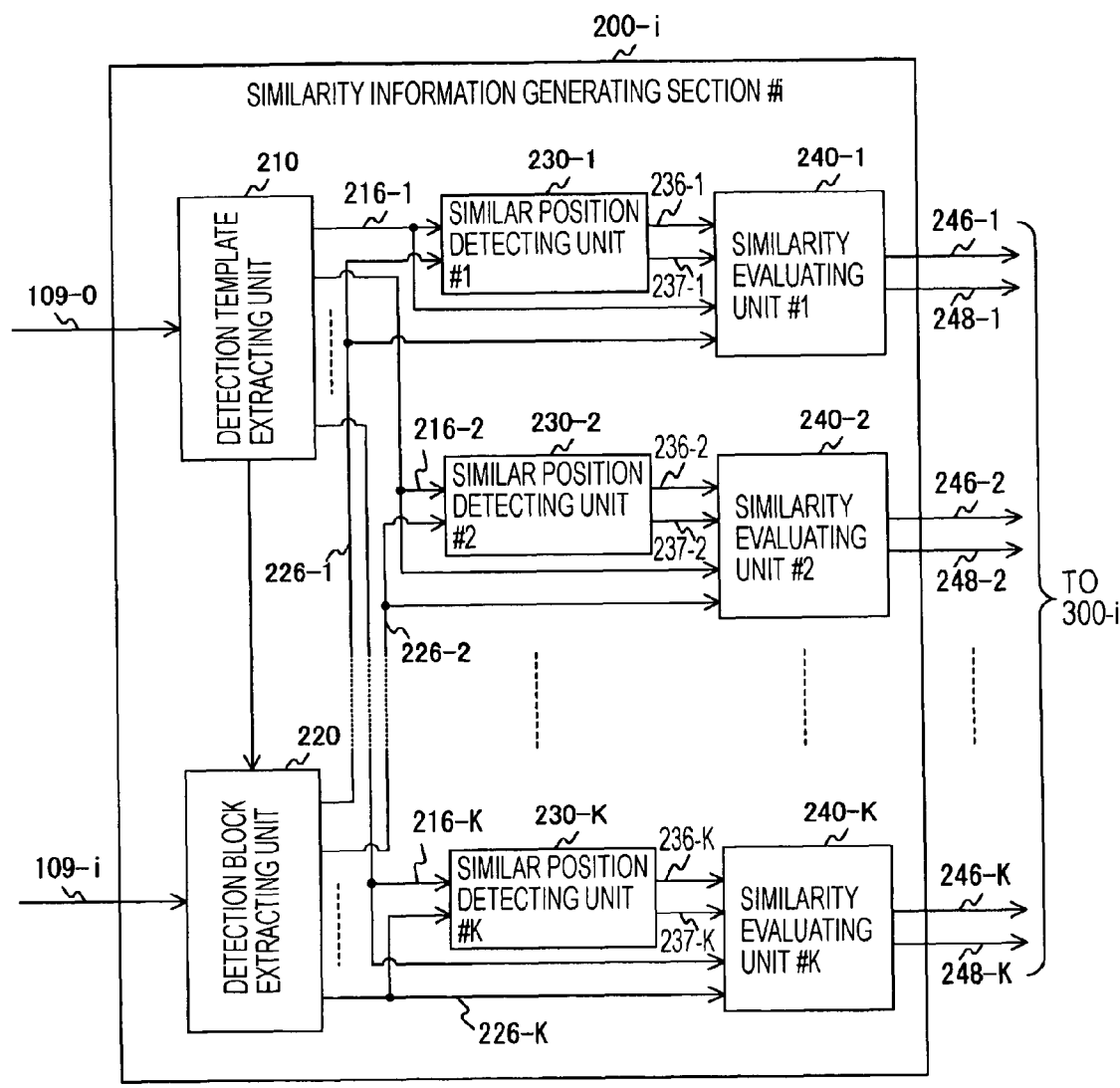
FIG. 5 is a diagram showing an example of a configuration of a similarity information generating section 200-$i$ according to an embodiment of the present invention.

FIG. 5 is a diagram showing an example of a configuration of the similarity information generating section 200-$i$ according to an embodiment of the present invention. The ith similarity information generating section 200-$i$ generates similarity information of the ith intermediate resolution image 109-$i$. The ith similarity information generating section 200-$i$ has a detection template extracting unit 210, a detection block extracting unit 220, K similar position detecting units 230-1 to 230-K, and K similarity evaluating units 240-1 to 240-K.

The detection template extracting unit 210 extracts detection templates in the output resolution image 109-0. As mentioned before, there are K detection sizes for the detection templates. Thus, K detection templates 216-1 to 216-K are supplied to the similar position detecting units 230-1 to 230-K and the similarity evaluating units 240-1 to 240-K, respectively.

The detection block extracting unit 220 extracts the detection blocks in the intermediate resolution image 109-$i$ corresponding to the detection templates extracted by the detection template extracting unit 210. K detection blocks 226-1 to 226-K corresponding to the K detection templates 216-1 to 216-K are supplied to the similar position detecting units 230-1 to 230-K and the similarity evaluating units 240-1 to 240-K, respectively.

The similar position detecting units 230-1 to 230-K perform the image detection operation in the detection blocks 226-1 to 226-K using the detection templates 216-1 to 216-K, respectively. The similar position detecting units 230-1 to 230-K output information of similar positions 236-1 to 236-K and similarities of the similar positions 237-1 to 237-K as the image detection result, respectively.

The similarity evaluating units 240-1 to 240-K evaluate the similarity on the basis of the information of the similar positions 236-1 to 236-K and the similarities 237-1 to 237-K supplied from the similar position detecting units 230-1 to 230-K, and output weight 248-1 to 248-K of similar positions 236-1 to 236-K together with the similar positions 246-1 to 246-K, respectively. The similar positions 246-1 to 246-K and the weight thereof 248-1 to 248-K are supplied to the texture generating sections 300 as the similarity information.

Figure 6:
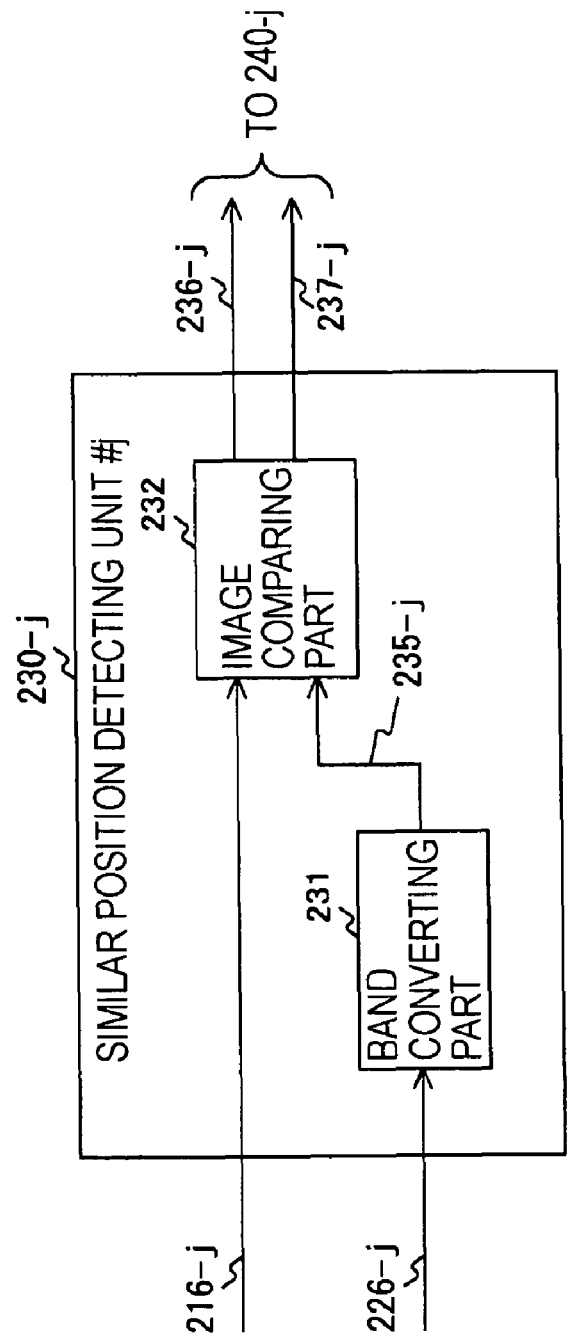
FIG. 6 is a diagram showing an example of a configuration of a similar position detecting unit 230-$j$ according to an embodiment of the present invention.

FIG. 6 is a diagram showing an example of a configuration of the similar position detecting unit 230-$j$ according to an embodiment of the present invention. The jth similar position detecting unit 230-$j$ has a band converting part 231 and an image comparing part 232.

The band converting part 231 generates a detection block 235-$j$ by making a change in a specific frequency band of the detection block 226-$j$. For example, the band converting part 231 removes high-frequency components using, for example, a low-pass filter. By this operation, the frequency bands of the detection template 216-$j$ and the detection block 235-$j$ are adjusted to the equivalent level.

The image comparing part 232 performs an image comparison operation in the detection block 235-$j$ whose frequency band is converted by the band converting part 231 with respect to the detection template 216-j. By this image comparison operation, the similar position 236-j is detected, and the similar position 236-j and the similarity thereof 237-j are output.

Figure 7:
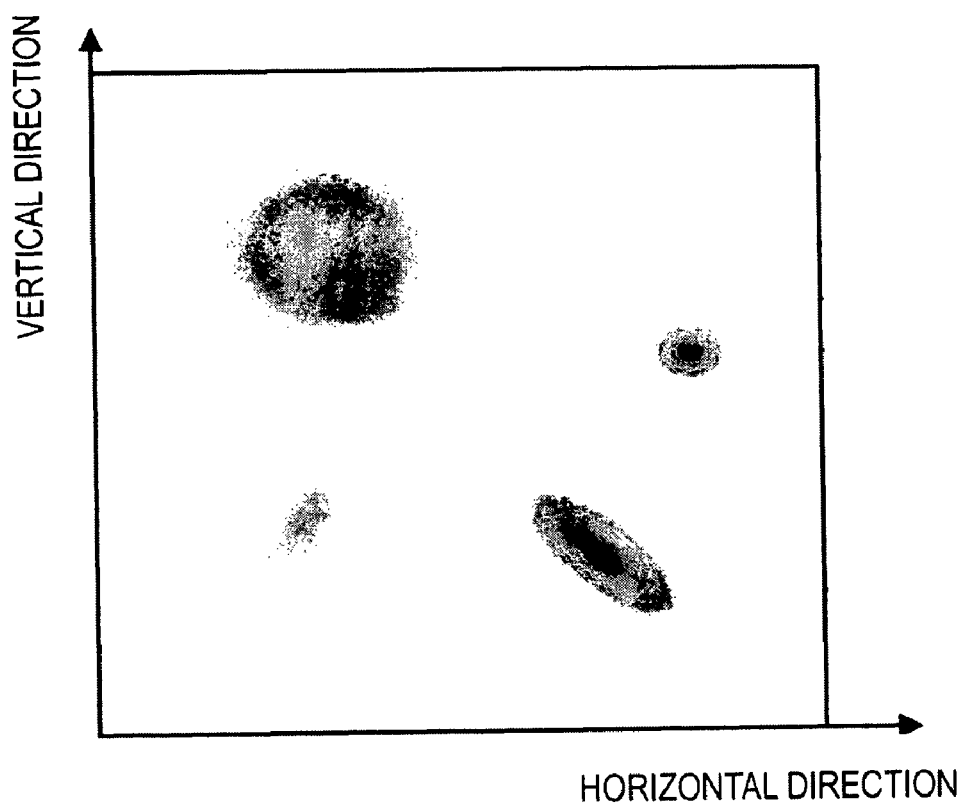
FIG. 7 is a diagram showing an example of image comparison performed by a similar position detecting unit 230 according to an embodiment of the present invention.

FIG. 7 is a diagram showing an example of an image comparison operation performed by the similar position detecting unit 230 according an embodiment of the present invention. Here, an example in which SAD (sum of absolute difference) is used as an evaluation indicator of the similarity is shown. SAD is a sum of brightness differences between the detection block 235-j and the detection template 216-j. In this figure, SAD is plotted in a two-dimensional plane. The white part indicates a large SAD value (i.e., low similarity), whereas the dark part indicates a small SAD value (i.e., high similarity).

The similar position detecting unit 230-j detects one or more minimum values as the similar positions in each detection block. In this figure, since there are four dark areas, four similar positions are detected. The similar position detecting unit 230-j outputs the SAD values at the four similar positions as the similarities.

Although SAD is used as the evaluation indicator of the similarity here, other evaluation indicators such as SSD (sum of square difference) may be used other than SAD. In addition, the similarity may be evaluated according to the degree of matching after analyzing a quantity of features, such as edges and corner points, in each image. Furthermore, a feature vector obtained by combining SAD and the feature quantity may be used.

FIG. 8 is a diagram showing an example of a configuration of the similarity evaluating unit 240-j according to an embodiment of the present invention. The similarity evaluating unit 240-j has L(j) pixel reliability determining parts 241-1 to 241-Lj, L(j) similar position reliability determining parts 242-1 to 242-Lj, and L(j) similar position weight determining parts 243-1 to 243-Lj.

There are L(j) pairs of similar position 236-j and the similarity thereof 237-j supplied from the similar position detecting unit 230-j. To identify these pairs, the similar position of a qth pair is represented as similar position 236-j-q, and the similarity thereof is represented as similarity 237-j-q.

The pixel reliability determining part 241-q determines pixel reliability 244-q at the similar position 236-j-q on a pixel-by-pixel basis. On the other hand, the similar position reliability determining part 242-q determines similar position reliability 245-q representing the reliability of the entity of the similar position 236-j-q. That is, the similar position reliability indicates the reliable degree of the similar position relative to other similar positions. The similar position weight determining part 243-q determines a weight 248-j-q of the similar position 236-j-q on the basis of the pixel reliability 244-q and the similar position reliability 245-q.

The similarity evaluating unit 240-j outputs the similar position 236-j-q as the similar position 246-j-p without performing any operations on the similarity position 236-j-q.

Figure 9A:
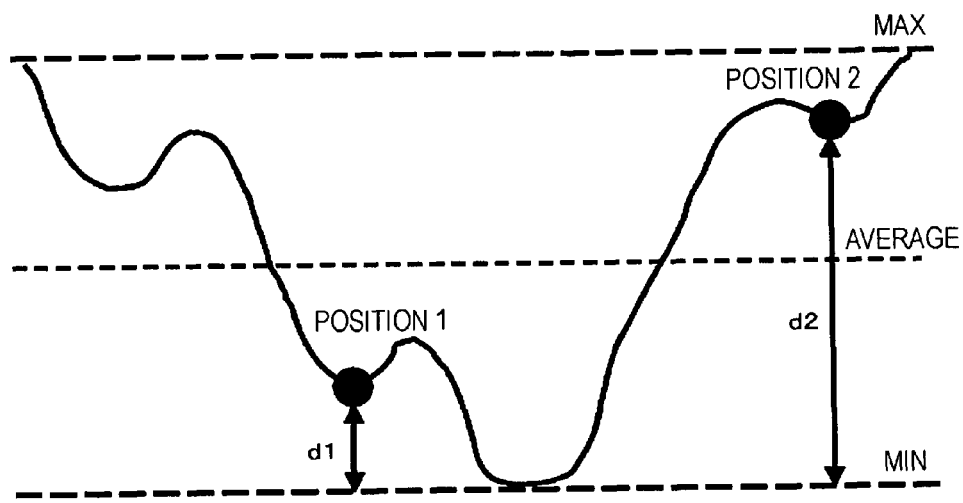
FIGS. 9A and 9B are diagrams showing an example of determining similar position reliability 245-$q$ performed by a similar position reliability determining part 242-$q$ according to an embodiment of the present invention.
Figure 9B:
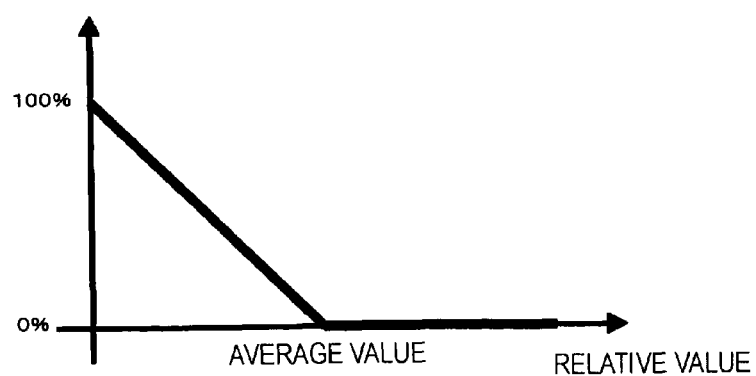

FIGS. 9A and 9B are diagrams showing an example of a process of determining the similar position reliability 245-q by the similar position reliability determining part 242-q according to an embodiment of the present invention. FIG. 9A shows an example in which SAD is used as an evaluation indicator of the similarity. In the figure, each position is shown in the horizontal direction, whereas SAD at each position is shown in the vertical direction.

The bottom line indicates the minimum value, whereas the top line indicates the maximum value. In addition, an average level is shown between the maximum and minimum values. In this figure, a relative value d1 from the minimum value is shown at a position 1, whereas a relative value d2 from the minimum value is shown at a position 2.

To determine the similar position reliability 245-q representing the reliability of the entire similar position from such SAD values, a determination criterion shown in FIG. 9B is set. More specifically, like the position 2, when the relative SAD value is greater than the average value, the similar position reliability is determined to be 0%. On the other hand, like the position 1, when the relative SAD value is at or lower than the average value, the similar position reliability is set such that the reliability approaches 100% as the relative SAD value approaches the minimum value.

Figure 10A:
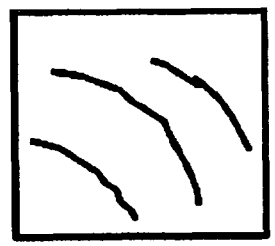
FIGS. 10A to 10D are diagrams showing an example of determining pixel reliability performed by a pixel reliability determining part 241-$q$ according to an embodiment of the present invention.
Figure 10B:
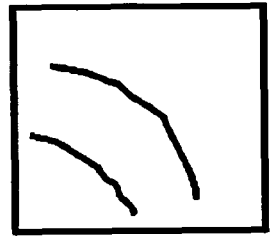

FIGS. 10A to 10D are diagrams showing an example of a process of determining the pixel reliability by the pixel reliability determining part 241-q according to an embodiment of the present invention. FIG. 10A shows an example detection template 216-j in the output resolution image 109-0. FIG. 10B shows an example image at a similar position 236-j-q in a detection block 226-j.

Figure 10C:
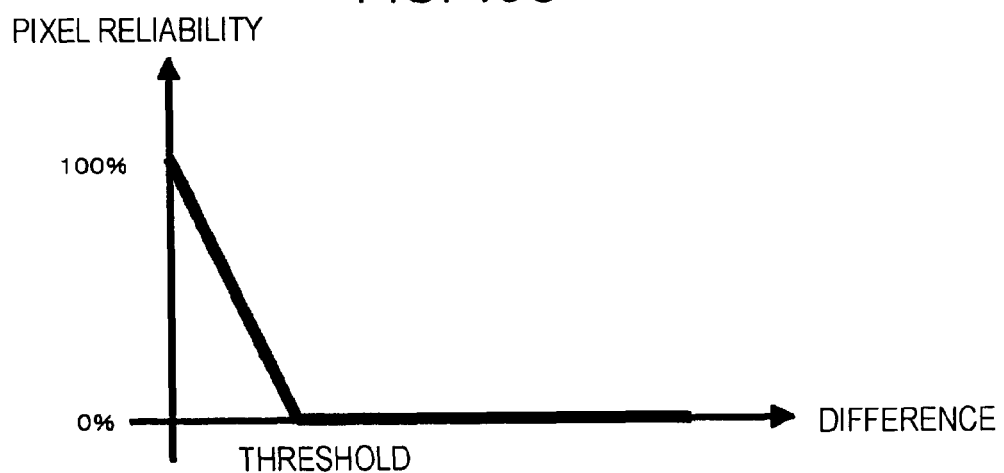
Figure 10D:
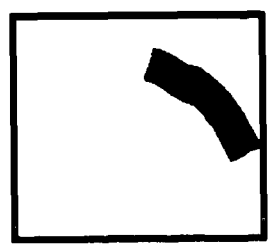

The pixel reliability determining part 241-q determines absolute values of differences between each pixel in FIG. 10A and a corresponding pixel in FIG. 10B, and determines the pixel reliability for each pixel on the basis of a determination criterion shown in FIG. 10C. More specifically, when the absolute value of the difference between pixels exceeds a predetermined threshold, the pixel reliability is set at 0%. On the other hand, when the absolute value does not exceed the threshold, the pixel reliability is set such that the reliability approaches 100% as the absolute value becomes smaller. Accordingly, the pixel reliability shown in FIG. 10D is determined. In this figure, the white part indicates high pixel reliability, whereas the dark part indicates low pixel reliability.

The similar position weight determining part 243-j determines the weight 248-j-q of the similar position 236-j-q on the basis of the pixel reliability 244-q and the similar position reliability 245-q determined in the above-described manner. For example, the weight 248-j-q of each pixel at the similar position 236-j-q is determined by multiplying the pixel reliability 244-q of each pixel by the similar position reliability 245-q representing the reliability of the entire similar position.

Figure 11:
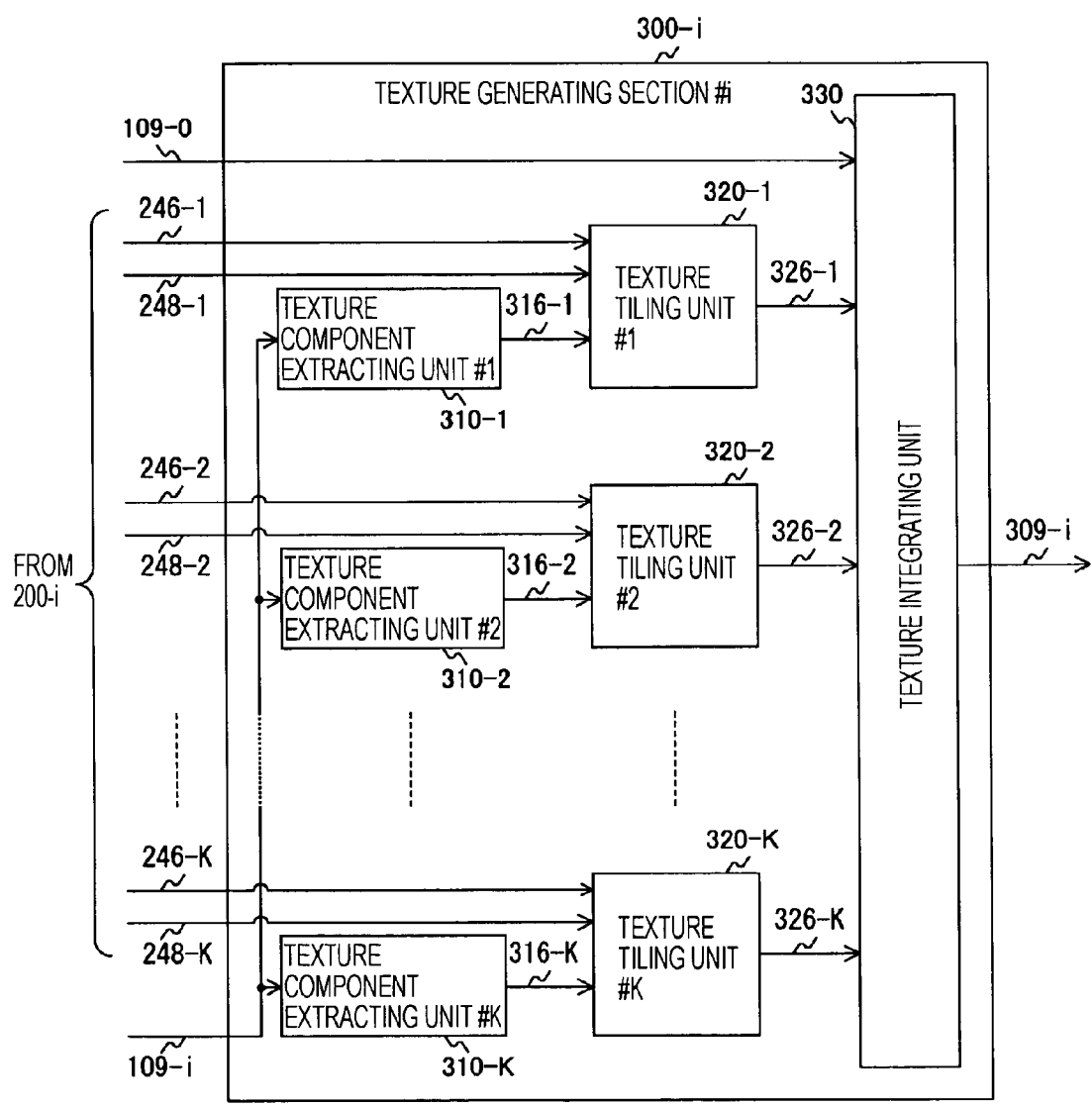
FIG. 11 is a diagram showing an example of a configuration of a texture generating section 300-$i$ according to an embodiment of the present invention.

FIG. 11 is a diagram showing an example configuration of a texture generating section 300-i according to an embodiment of the present invention. The texture generating section 300-i has K texture component extracting units 310-1 to 310-K, K texture tiling units 320-1 to 320-K, and a texture integrating unit 330.

A texture component extracting unit 310-j extracts a texture component 316-j in the intermediate resolution image 109-i. For example, a bandpass filter having different band peak frequencies according to each detection size may be used.

A texture tiling unit 320-j generates C(j) texture blocks on the basis of the similarity information (246-j and 248-j) generated by the similarity information generating section 200-i, and generates a texture image for each detection size by tiling the texture blocks.

The texture integrating unit 330 integrates the texture images for each detection size generated by the texture tiling unit 320-j. The output of the texture integrating unit 330 of the texture generating section 300-i corresponds to the texture image 309-i for the ith intermediate resolution image.

Figure 12:
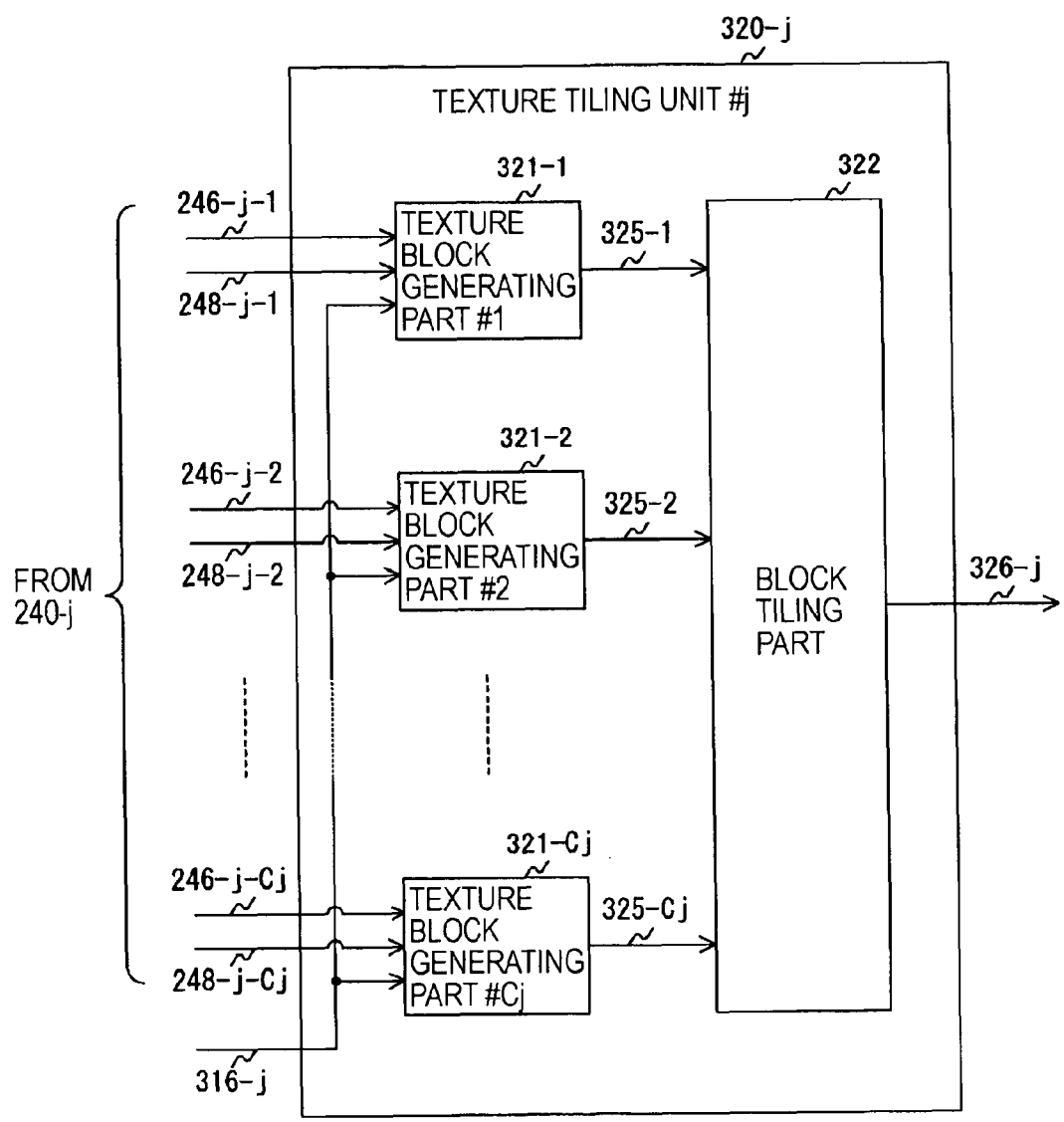
FIG. 12 is a diagram showing an example of a configuration of a texture tiling unit 320-$j$ according to an embodiment of the present invention.

FIG. 12 is a diagram showing an example of a configuration of the texture tiling unit 320-j according to an embodiment of the present invention. The texture tiling unit 320-j has C(j) texture block generating parts 321-1 to 321-Cj, and a block tiling part 322.

A texture block generating part 321-p generates a texture block 325-p from texture components 316-j on the basis of the similarity information (246-j-p and 248-j-p) generated by the similarity evaluating unit 240-j.

The block tiling part 322 performs tiling processing on C(j) texture blocks 325-1 to 325-Cj generated by the texture block generating part 321-1 to 321-Cj, respectively.

Figure 13:
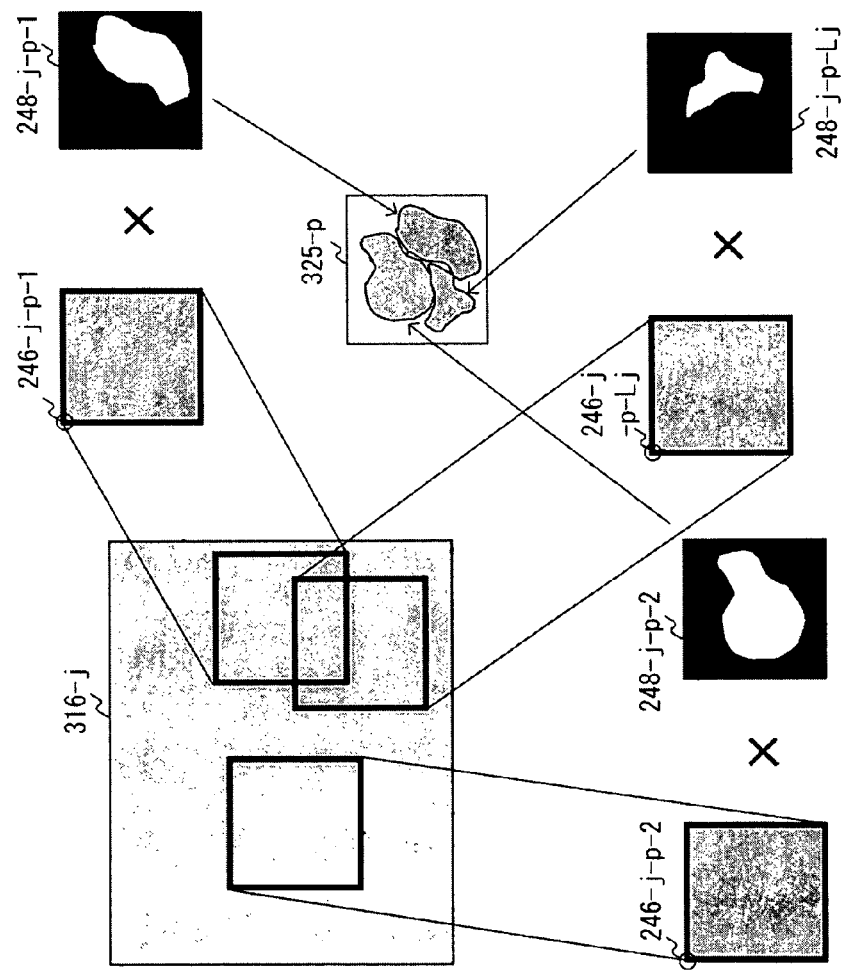
FIG. 13 is a diagram showing an example of generating a texture block performed by a texture block generating part 321-$p$ according to an embodiment of the present invention.

FIG. 13 is a diagram showing an example process of generating a texture block performed by the texture block generating part 321-*p* according to an embodiment of the present invention. The texture block generating part 321-*p* extracts images (gray parts) of L(j) similar positions 246-*j*-*p*-1 to 246-*j*-*p*-Lj in a texture component 316-*j*.

The texture block generating part 321-*p* combines L(j) images, obtained by multiplying each of the images of the similar positions 246-*j*-*p*-*j* to 246-*j*-*p*-Lj by the corresponding weights 248-*j*-*p*-1 to 248-*j*-*p*-Lj of the similar positions, in a manner shown in the figure, thereby generating a texture block 325-*p*. In this figure, although coordinates at an upper left corner of each gray area represent the similar position, other coordinates may be assigned to the similar position.

Figure 14:
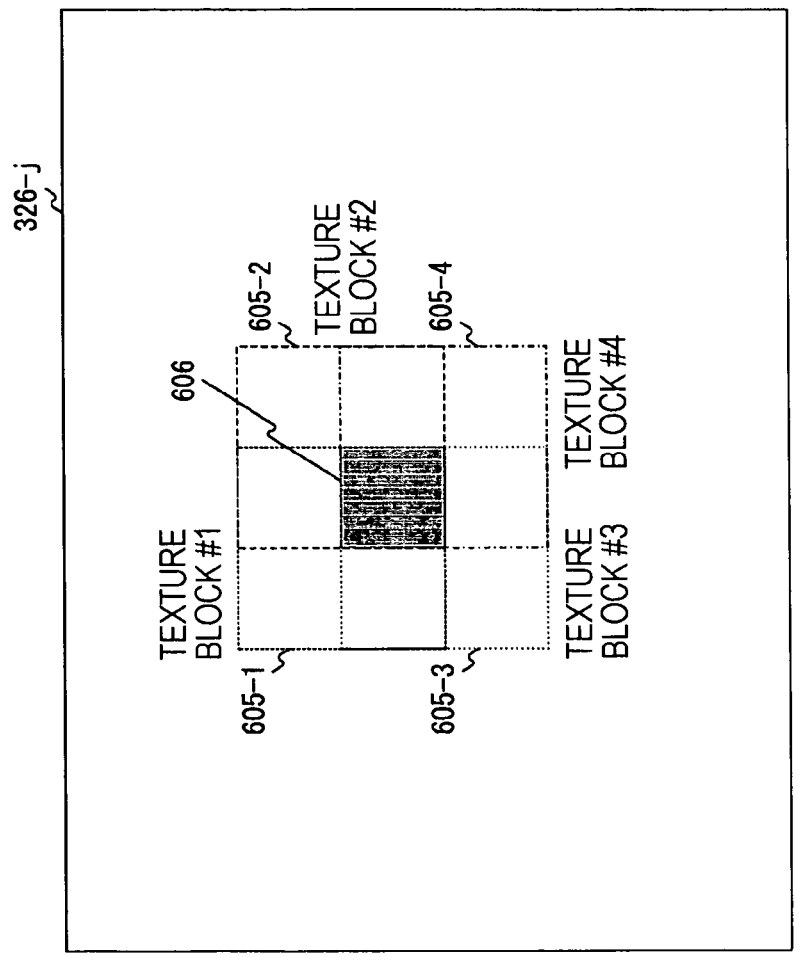
FIG. 14 is a diagram showing a manner of a tiling operation performed by a block tiling part 322 according to an embodiment of the present invention.

FIG. 14 is a diagram showing an example of a tiling operation performed by the block tiling part 322 according to an embodiment of the present invention. The texture blocks generated by the texture block generating part 321-*p* may be tiled together without any operations. However, in such a case, there is a possibility that joints of the texture blocks stand out especially at strong edges.

Accordingly, this example uses a common part obtained when four texture blocks 605-1 to 605-4 are stacked with a half of each texture block being shifted one another as a texture component 606 used for tiling. By tiling the texture component 606 generated in such a manner over the entire image, the texture image 326-*j* is generated.

Figure 15:
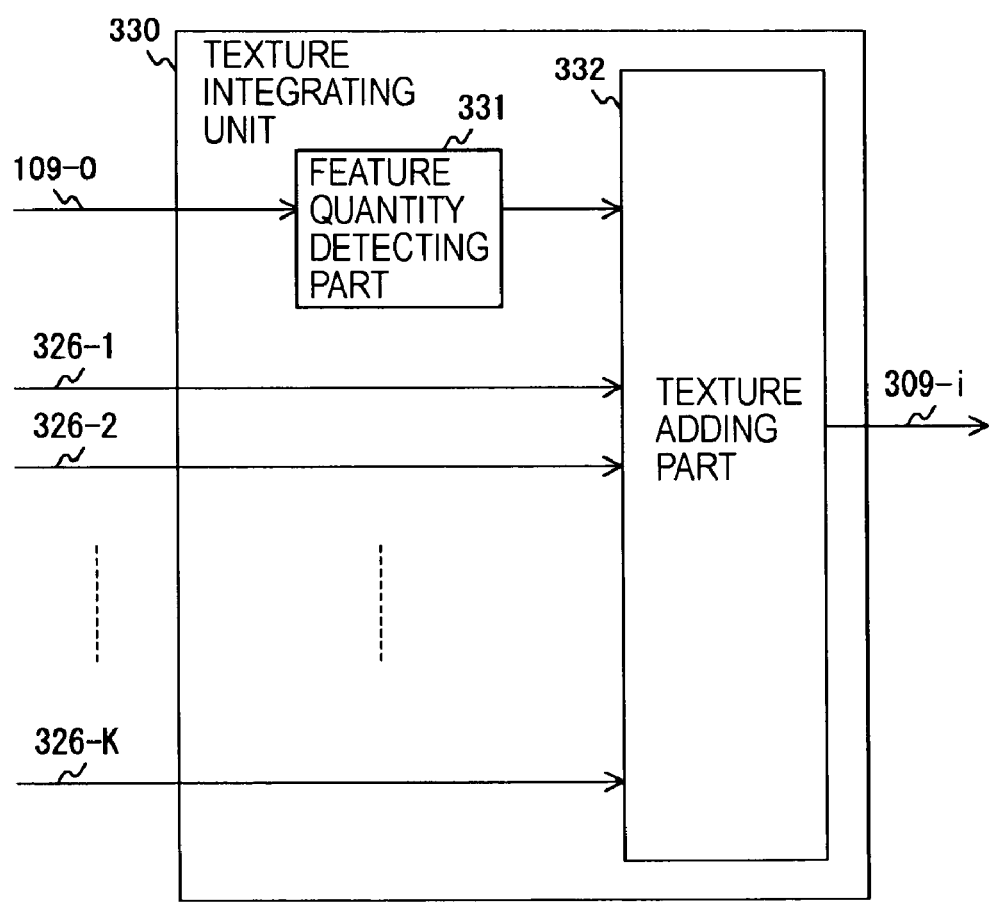
FIG. 15 is a diagram showing an example of a configuration of a texture integrating unit 330 according to an embodiment of the present invention.

FIG. 15 is a diagram showing an example of a configuration of the texture integrating unit 330 according to an embodiment of the present invention. The texture integrating unit 330 includes a feature quantity detecting part 331 and a texture adding part 332.

The feature quantity detecting part 331 detects a quantity of local features in the output resolution image 109-0. For example, edge intensity may be detected as the quantity of local features. According to the quantity of local features, the texture adding part 332 adds the texture images 326-1 to 326-K for K detection sizes so as to generate the texture image 309-*i* of an ith resolution.

Figure 16A:
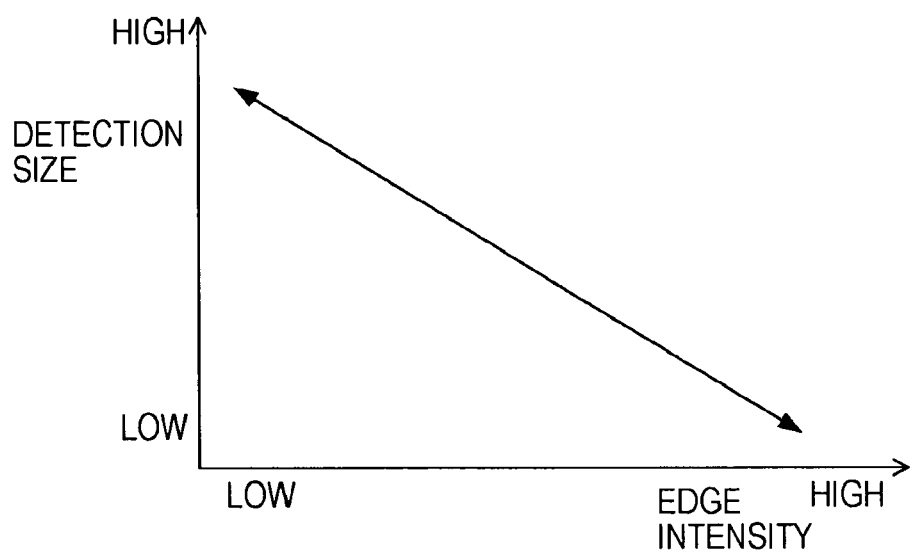
FIGS. 16A and 16B are diagrams showing an example control operation performed by a texture integrating unit 330 according to an embodiment of the present invention.
Figure 16B:
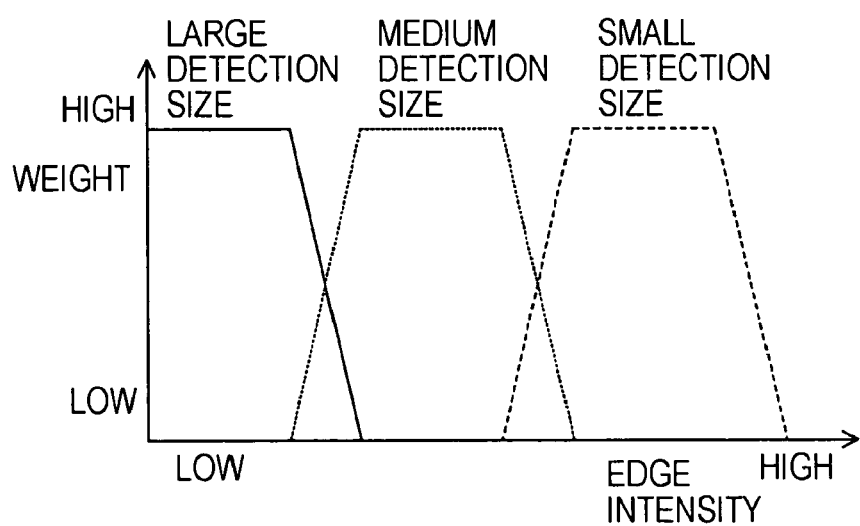

FIGS. 16A and 16B are diagrams showing an example control operation performed by the texture integrating unit 330 according to an embodiment of the present invention. In a case where the feature quantity detecting part 331 uses, for example, the edge intensity as the quantity of local features, it is probable that smaller detection size is employed as the edge intensity becomes higher. This is because the high edge intensity may indicate inclusion of a boundary not a pattern of an object. Thus, in such a case, it is thought that employing the smaller detection size so as to exclude the boundaries is more effective.

For example, when three detection sizes exist as shown in FIG. 16B, the weight is calculated so that the smaller detection size is employed as the edge intensity becomes higher. The texture adding part 332 then performs an addition operation as shown in a following equation according to the weight. In equation, T represents a texture image having undergone the addition operation, whereas $T_A$, $T_B$, and $T_C$ represent texture images of large, medium, and small detection sizes, respectively. $W_A$, $W_B$, and $W_C$ denote the weights of the texture images of the large, medium, and small detection sizes, respectively (FIG. 16B).

$$T = W_A \cdot T_A + W_B \cdot T_B + W_C \cdot T_C$$

The texture blending section 400 blends the texture images 309-1 to 309-N corresponding to each resolution obtained in this way with the output resolution image 109-0. The texture blending section 400 performs the blending according to, for example, a following equation. Coefficients $\alpha_i$, $\beta$, and $\gamma$ are determined empirically.

$$\text{OUTPUT } IMAGE = \beta \cdot \text{OUTPUT RESOLUTION IMAGE} + \gamma \cdot \frac{\sum_{i=1}^{N} \alpha_i \cdot \text{TEXTURE IMAGE \# } i}{\sum_{i=1}^{N} \alpha_i}$$

Suppose that three texture images #1 to #3 having resolutions of 100%, 200%, and 400%, respectively, are used here. In such a case, for example, the coefficient $\alpha_i$ may be set as follows: $\alpha_1=2$; $\alpha_2=1$; and $\alpha_3=1$. In addition, the coefficient $\beta$ may be set at 1, whereas the coefficient $\gamma$ may be set approximately at 0.3.

In such a way, the output image 409 including the high-frequency components of the original image 101 is generated.

An operation of the image processing apparatus according to an embodiment of the present invention will be described next with reference to the drawings.

Figure 17:
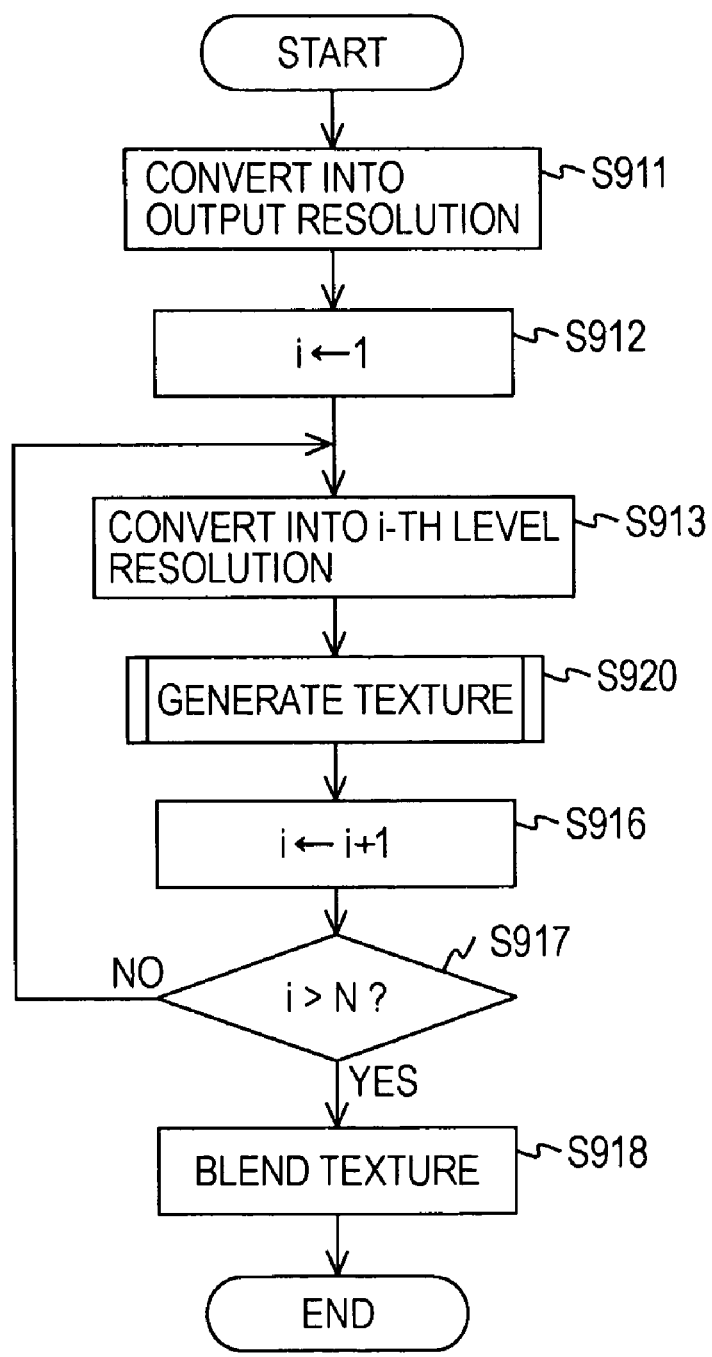
FIG. 17 is a flowchart showing an entire procedure of an image processing method according to an embodiment of the present invention.

FIG. 17 is a flowchart showing an entire procedure of an image processing method according to an embodiment of the present invention. Firstly, the resolution converting section 100-0 converts the original image 101 into the output resolution image 109-0 (STEP S911).

After initializing an index variable i at "1" (STEP S912), the ith resolution converting section 100-*i* converts the original image 101 into the intermediate resolution image 109-*i* (STEP S913). The similarity information generating section 200-*i* and the texture generating section 300-*i* generate the texture image 309-*i* from the intermediate resolution image 109-*i* and the output resolution image 109-0 (STEP S920). Then, the index variable i is incremented by 1 (STEP S916), and steps S913 to S917 are repeated until the incremented index variable i exceeds N (STEP S917).

The texture blending section 400 blends N texture images 309-1 to 309-N generated in such a manner with the output resolution image (STEP S918) so as to generate the output image 409.

Figure 18:
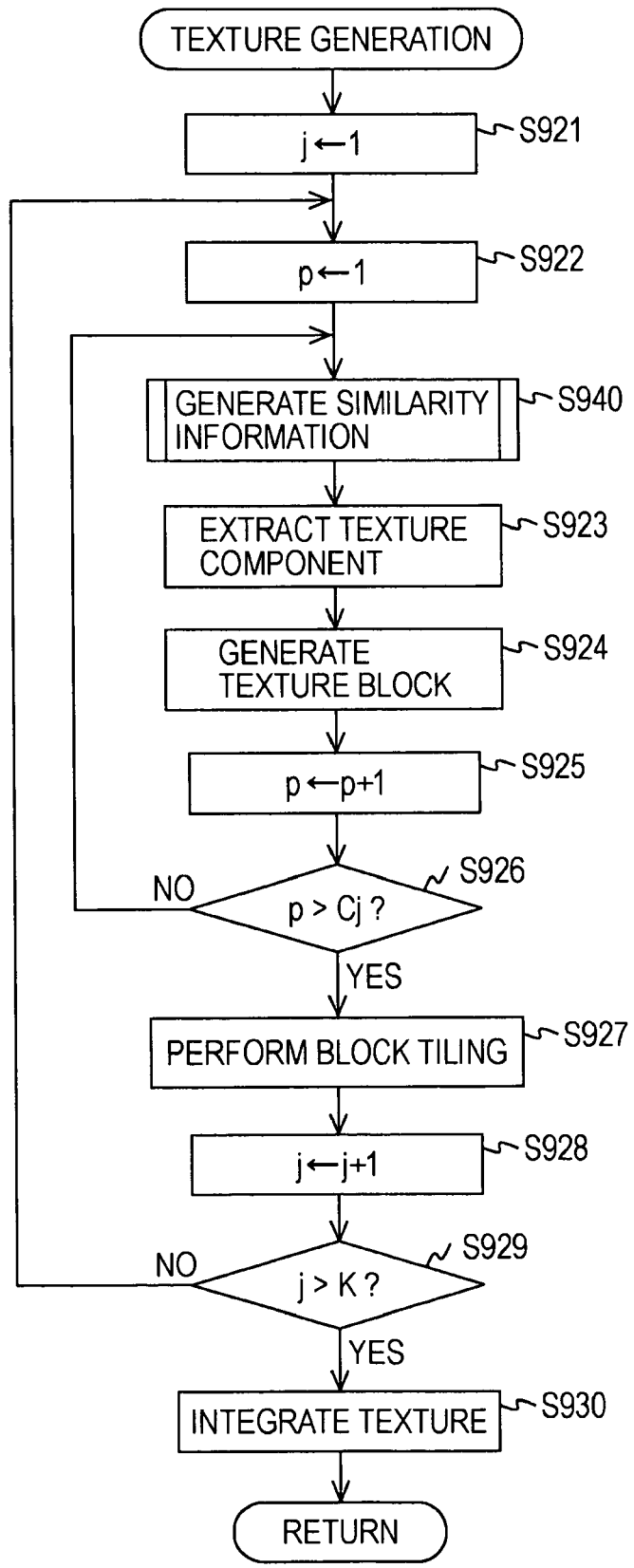
FIG. 18 is a flowchart showing a procedure of a texture generating operation according to an embodiment of the present invention.

FIG. 18 is a flowchart showing a procedure of the texture generating operation (STEP S920) according to an embodiment of the present invention. Firstly, index variables j and p are initialized at "1" (STEPs S921 and S922). The value of the index variable i is determined at the upper layer processing (FIG. 17).

The similarity information generating section 200 generates similarity information (246-*j*-*p* and 248-*j*-*p*) of the pth detection block having the jth detection size for the ith resolution (STEP S940). In addition, the texture component extracting unit 310-*j* extracts the texture component 316-*j* of jth detection size for the ith resolution (STEP S923). The texture block generating part 321-*p* generates a texture block 325-*p* on the basis of these similarity information and texture component (STEP S924).

Then, the index variable p is incremented by "1" (STEP S925), and steps S940 to S926 are repeated until the incremented index variable p exceeds C(j) (STEP S926).

After generating C(j) texture blocks 325-1 to 325-Cj, the block tiling part 322 performs the tiling operation of the texture blocks (STEP S927) so as to generate a texture image 326-*j* of the jth detection size for the ith resolution. Subsequently, the index variable j is incremented by "1" (STEP S928), and steps S922 to S929 are repeated until the incremented index variable j exceeds K (STEP S929).

After generating K texture images 326-1 to 326-K in such a manner, the texture integrating unit 330 integrates these texture images (STEP S930) so as to generate the texture image 309-*i* for the ith resolution.

Figure 19:
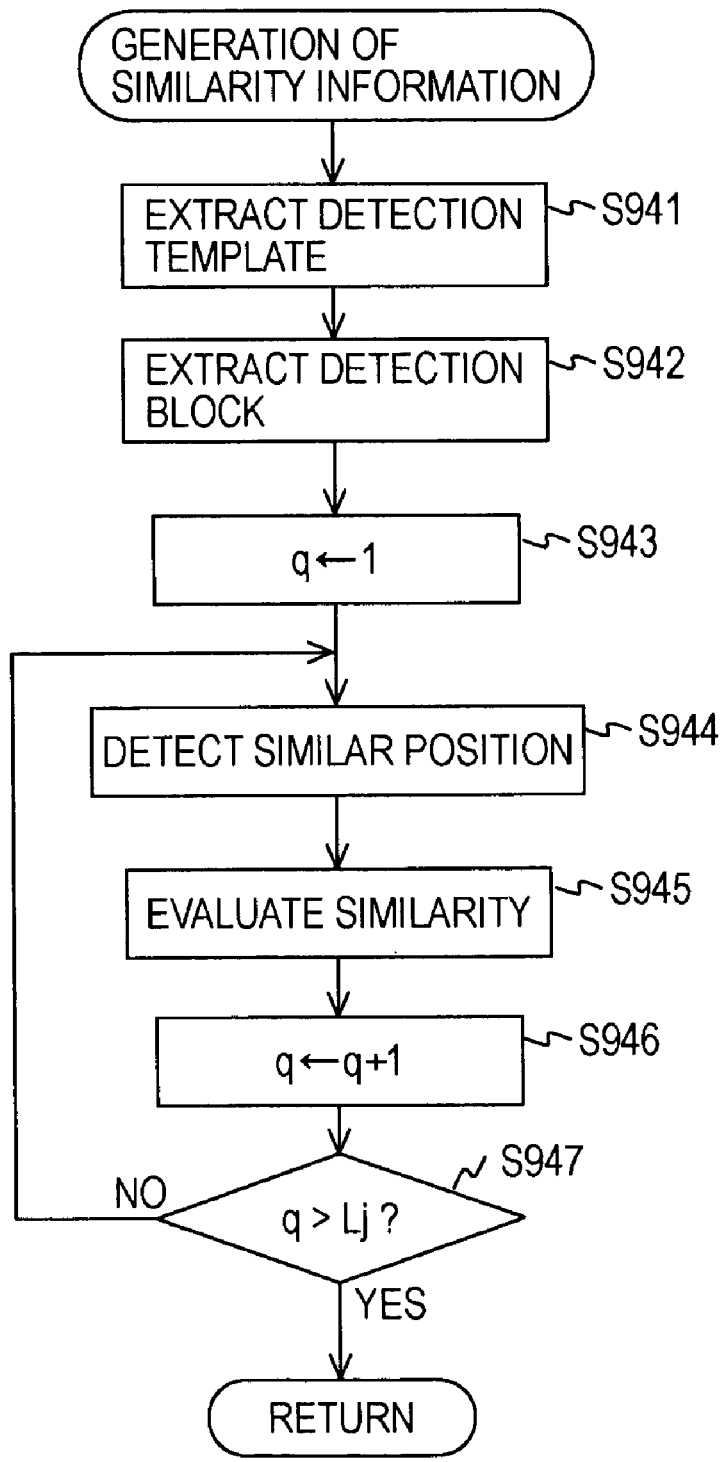
FIG. 19 is a flowchart showing a procedure of a similarity information generating operation (STEP S940) according to an embodiment of the present invention.

FIG. 19 is a flowchart showing a procedure of the similarity information generating operation (STEP S940) according to an embodiment of the present invention. The detection template extracting unit 210 extracts the detection template in the output resolution image 109-0 (STEP S941). The detection block extracting unit 220 extracts the detection block corresponding to the detection template in the intermediate resolution image 109-$i$ (STEP S942).

After initializing an index variable q at "1" (STEP S943), the similar position detecting unit 230-$j$ detects the qth similar position in the pth detection block having the jth detection size for the ith resolution (STEP S944). The values of the index variables i, j, and p are set at the upper layer processing (FIGS. 17 and 18).

The similarity evaluating unit 240-$j$ evaluates the similarity of the qth similar position in the pth detection block having the jth detection size for the ith resolution (STEP S945) so as to determine the weight of the similar position.

Then, the index variable q is incremented by "1" (STEP S946), and steps S944 to S947 are repeated until the incremented index variable q exceeds L(j) (STEP S947).

As described above, according to the embodiments of the present invention, the image processing apparatus that generates the output image 409 having the resolution the same as or higher than that of the original image 101 can generate stable output images having higher-quality than the original image by adding texture images that includes the high-frequency components of the intermediate resolution images 109-1 to 109-N, which have the resolutions different from that of the output image 409, to the output resolution image 109-0 having the same resolution as the output image 409.

Embodiments of the present invention are only examples that embody the present invention, and have the following correspondence with the features described in the claims. However, it should be noted that the present invention is not limited to these embodiments, and various modifications can be made without departing from the spirit and scope of the present invention.

More specifically, according to an embodiment, first image converting means corresponds to, for example, a resolution converting section 100-0. In addition, second image converting means corresponds to, for example, resolution converting units 100-1 to 100-N. Additionally, similarity information generating means and texture generating means correspond to, for example, similarity information generating sections 200-1 to 200-N and texture generating sections 300-1 to 300-N, respectively. Furthermore, texture blending means corresponds to, for example, a texture blending section 400. Moreover, a predetermined partial area in an output resolution image and a block in an intermediate resolution image correspond to, for example, a detection template and a detection block, respectively.

According to another embodiments of the present invention, a step of converting the resolution of the original image into the sane resolution as the output image so as to generate an output resolution image corresponds to, for example, STEP S911. In addition, a step of converting the resolution of the original image into a resolution different from that of the output image so as to generate an intermediate resolution image corresponds to, for example, STEP S913. Additionally, a step of detecting a plurality of similar areas, in a block in the intermediate resolution image corresponding to a predetermined partial area in the output resolution image, that resemble the partial area, and generating similarity information including a position of each of the plurality of similar areas in the intermediate resolution image and a weight of the position corresponds to, for example, STEP S940. Furthermore, a step of generating a texture image by combining high-frequency components of the intermediate resolution image at the position indicated in the similarity information in accordance with the weight indicated in the similarity information corresponds to, for example, STEP S920. Moreover, a step of blending the output resolution image and the texture image so as to generate the output image corresponds to, for example, STEP S918.

The procedure described in the embodiments of the preset invention may be considered as a method having the series of steps. Alternatively, the procedure may be considered as a program causing a computer to execute the series of steps or a storage medium storing the program.

What is claimed is:

1. A computer implemented image processing method for an image processing apparatus that generates an output image having a resolution the same as or higher than that of an original image, the image processing method comprising:
   converting, by a computer, the resolution of the original image into the same resolution as the output image so as to generate an output resolution image;
   converting, by a computer, the resolution of the original image into a resolution different from that of the output image so as to generate an intermediate resolution image;
   detecting, by a computer, a plurality of similar areas, in a block in the intermediate resolution image corresponding to a predetermined partial area in the output resolution image, that resemble the partial area, and generating similarity information including a position of each of the plurality of similar areas in the intermediate resolution image and a weight of the position;
   generating, by a computer, a texture image by combining high-frequency components of the intermediate resolution image at the position indicated in the similarity information in accordance with the weight indicated in the similarity information; and
   blending, by a computer, the output resolution image and the texture image so as to generate the output image.

2. A non-transitory computer readable medium for generating an output image having a resolution the same as or higher than that of an original image, the computer readable medium storing program code which when executed by a computer performs operations comprising:
   converting the resolution of the original image into the same resolution as the output image so as to generate an output resolution image;
   converting the resolution of the original image into a resolution different from that of the output image so as to generate an intermediate resolution image;
   detecting a plurality of similar areas, in a block in the intermediate resolution image corresponding to a predetermined partial area in the output resolution image, that resemble the partial area, and generating similarity information including a position of each of the plurality of similar areas in the intermediate resolution image and a weight of the position;
   generating a texture image by combining high-frequency components of the intermediate resolution image at the position indicated in the similarity information in accordance with the weight indicated in the similarity information; and
   blending the output resolution image and the texture image so as to generate the output image.

* * * * *